July 28, 1953  J. D. KREIS  2,646,686
COUPLING FOR OFFSET SHAFTS
Original Filed Oct. 9, 1946  4 Sheets-Sheet 1
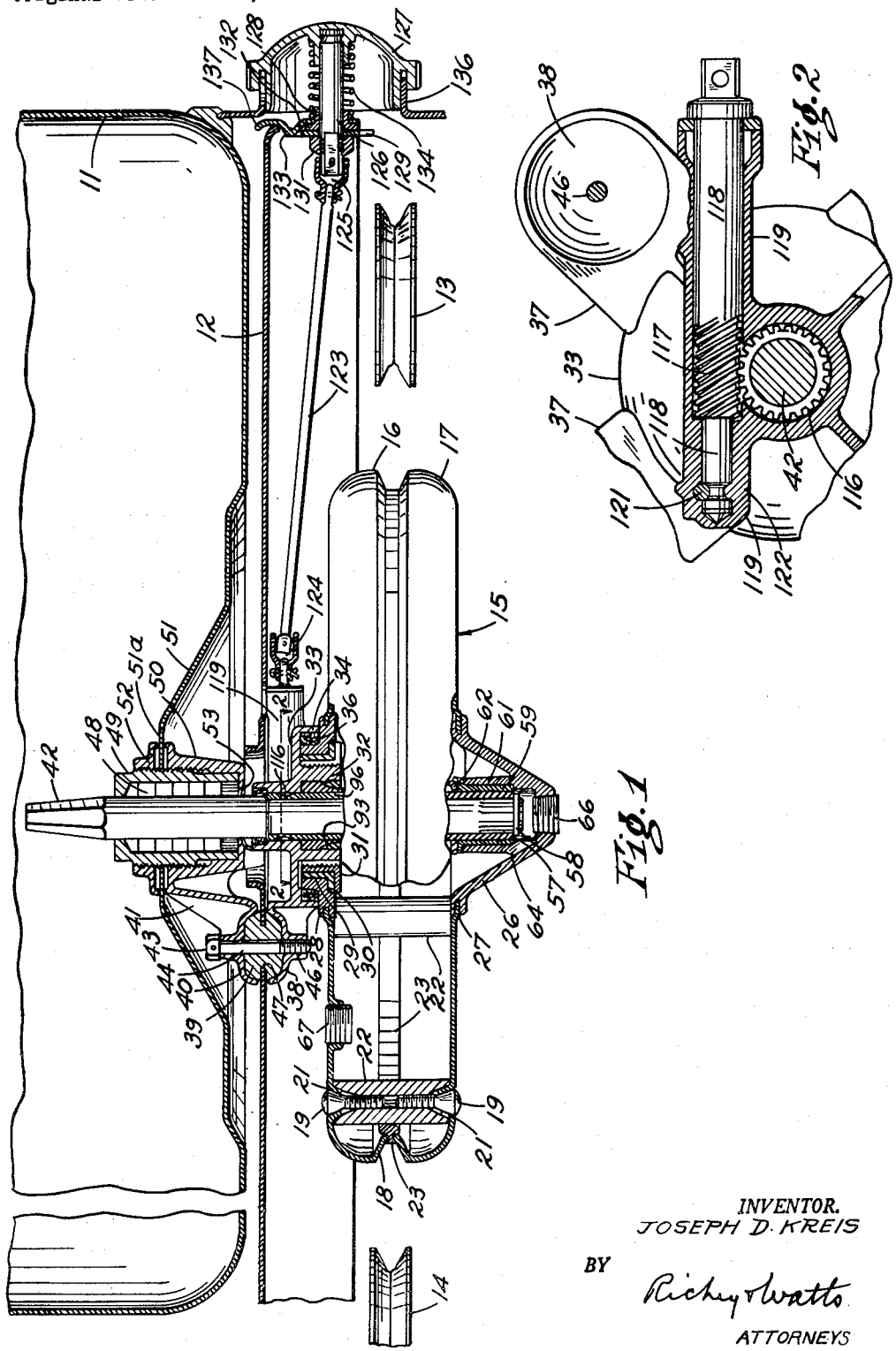
INVENTOR.
JOSEPH D. KREIS
BY
Richey & Watts
ATTORNEYS July 28, 1953 J. D. KREIS 2,646,686
COUPLING FOR OFFSET SHAFTS
Original Filed Oct. 9, 1946 4 Sheets-Sheet 2

INVENTOR.
JOSEPH D. KREIS
BY
*Richey & Watts*
ATTORNEYS

July 28, 1953 J. D. KREIS 2,646,686
COUPLING FOR OFFSET SHAFTS
Original Filed Oct. 9, 1946 4 Sheets-Sheet 3

INVENTOR.
JOSEPH D. KREIS
BY
Richey & Watts
ATTORNEYS

July 28, 1953 J. D. KREIS 2,646,686
COUPLING FOR OFFSET SHAFTS
Original Filed Oct. 9, 1946 4 Sheets-Sheet 4

INVENTOR.
JOSEPH D. KREIS
BY
Ridley Hurth
ATTORNEYS

Patented July 28, 1953

2,646,686

UNITED STATES PATENT OFFICE 2,646,686

COUPLING FOR OFFSET SHAFTS

Joseph D. Kreis, Cleveland, Ohio

Original application October 9, 1946, Serial No. 702,154. Divided and this application January 27, 1951, Serial No. 208,212

9 Claims. (Cl. 74—63)

1

This invention relates to power transmissions and, more particularly, to apparatus for coupling offset shafts for concurrent rotation. In the embodiment described herein, the invention is applied to a device for converting continuous rotary motion into oscillatory rotary motion, this application constituting a division of my application, Serial No. 702,154, filed October 9, 1946, now U. S. Patent No. 2,553,859, issued May 22, 1951, in which that device is described.

An object of the invention is to provide a mechanism for coupling offset shafts at the ends thereof.

An object of the invention is the coupling of non-coaxial shafts for concurrent rotation.

A further object of the invention is the provision of a coupling suitable for rotating offset axes and which may be adjusted to vary the amount of spacing between the shafts during rotation.

A still further object of the invention is the provision of a power transmission device adaptable for offset shafts and adjustable while in rotation.

Other objects and advantages more or less ancillary to the foregoing and the manner in which all the various objects are realized will appear in the following description, which, considered in connection with the accompanying drawings, sets forth the preferred embodiment of the invention.

Referring to the drawings:

Fig. 1 is an elevational view, partly in section, illustrating the application of the invention to a washing machine;

Fig. 2 is a sectional view of a fragmentary portion taken on a plane indicated on a line 2—2 of Fig. 1;

Figure 6:
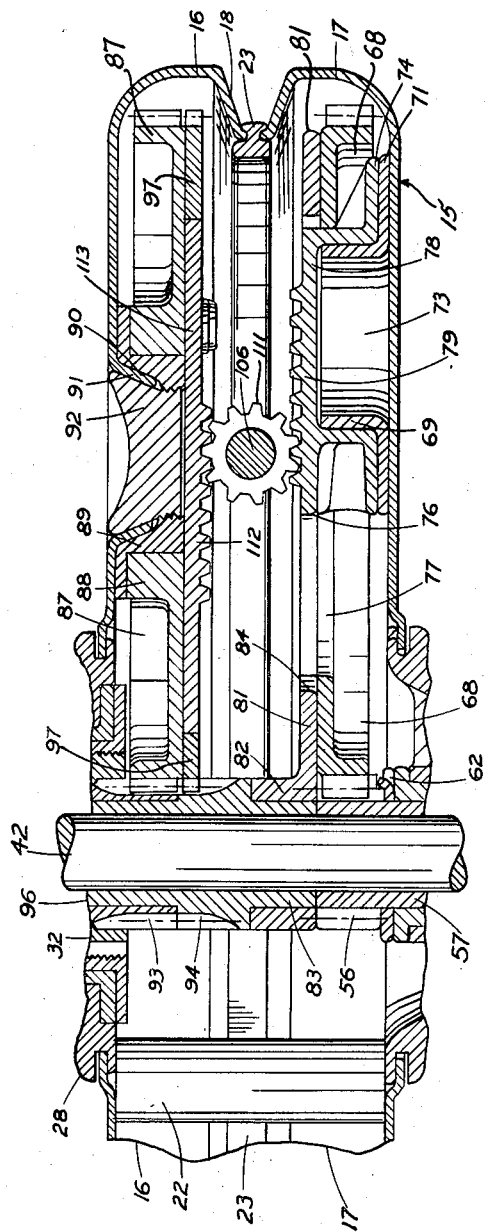
Fig. 6 is a vertical section through the planet gears taken on a plane indicated by the line 6—6 in Fig. 3.

Referring to Fig. 1, the invention is illustrated as incorporated in a conventional washing machine having a tub 11 mounted on a frame 12 and including a drive pulley 13 associated with a motor (not shown) and a power take-off pulley 14 for the operation of a wringer (not shown). The gearing which forms the subject of this invention is principally enclosed in a housing 15 in the form of a hollow pulley. The agitator shaft 42 extends upward from the housing through a gland in the bottom of the tub. The housing 15 comprises two flanged sheet metal stampings 16 and 17 (Figs. 1 and 6) which are annular in form and struck with the marginal portions thereof directed inwardly to form the sides 18 of a V-belt pulley when the two stampings are assembled in opposed relation to each other. The two stampings 16 and 17 are retained in clamped relation by conical-headed screws 19 seated in openings 21 in the stampings and threaded into spacing sleeves 22. A gasket 23, preferably composed of synthetic rubber, is clamped between the opposed edges of the flanges 18, providing a seal against leakage of oil from the housing. The lower hub 26 of the housing 15 is formed by a frusto-conical malleable casting having a peripheral groove 27 therein for the reception of the inner circumference of the stamping. The walls of the casting 26, defining the groove 27, are rolled or pressed into intimate oil-tight engagement with the stamping 17 to effect the support thereof. The upper hub 28 is sealed into the upper stamping 16 in the same manner. The hub 28 is provided with a counter-bored central opening 29 into which is pressed a flanged bushing 30 which forms a radial and thrust bearing surface for rotational support of the housing 15. The bushing 30 is journalled on a flanged sleeve 31 threaded onto a depending cylindrical portion 32 of a spider 33. The spider is formed with a cylindrical flange 34 circumjacent the hub 28 which defines a pocket between the flange and hub for the retention of packing 36. The spider 33 is further formed with a plurality of equally spaced ears 37 having cups 38 in the extremities thereof for the reception of vibration-dampening rubber bushings 39 which are compressively supported in the cups 38 and in similar cups 40 in a bearing member 41. The bearing 41 constitutes the support for the agitator shaft 42. Cap screws 43 retain the bearing member 41 and the spider 33 on the frame member 12, the cap screws being passed through openings 44 in the cups 40 and being received in threaded openings 46 in the cups 38. The bushings 39 are molded with peripheral grooves therein for the retention of the marginal edges of openings 47 in the frame member 12. The agitator shaft 42 is sealed against leakage by packing 48 retained by a sleeve 49 threaded into a cup 50 formed in the central portion of the bearing member 41. The bottom 51 of the tub is retained between a flange 51a of the casting and a nut 52 threaded onto the sleeve 49. The agitator shaft passes through an opening 53 in the bottom of the cup 50, through the casting 33 and into the housing 15.

The agitator shaft is driven by a sun pinion 56 (Fig. 6) formed integral with a sleeve 57, splined to the lower end of the shaft (Fig. 1) and retained by a spring collar 58. The lower end of the shaft 42 is journalled in a flanged bushing 59, pressed into a bore in a central cylindrical portion 61 of the hub casting 26. A thrust washer 62, keyed to the sun pinion, by a tab which is bent for engagement between teeth in the face of the pinion, is interposed between the pinion and the thrust bearing face of the bushing 59.

Oil may be drained from the housing through a passage 64 in the hub 26 by removing a plug 66 at the bottom of the hub. A plug 67, threaded into the upper stamping 16 of the housing, is provided to facilitate replenishment of the oil. The mechanism preferably runs in a bath of oil.

The oscillating gear contained in the housing 15 is based upon the principles disclosed in my copending application, Serial No. 667,965, filed May 7, 1946, now Patent No. 2,553,858 for "Oscillating Gear." A non-rotating sun pinion in the upper part of the housing is disposed in coaxial relation with the sun pinion 56 on the agitator shaft. A concentric planet gear, rotatably mounted in the housing, is rolled around the fixed sun gear, and drives an eccentric planet gear, which meshes with the pinion 56, through a coupling device which enforces equal rotation of the two planet gears about their axes, and accommodates lateral displacement of the axes.

Figure 3:
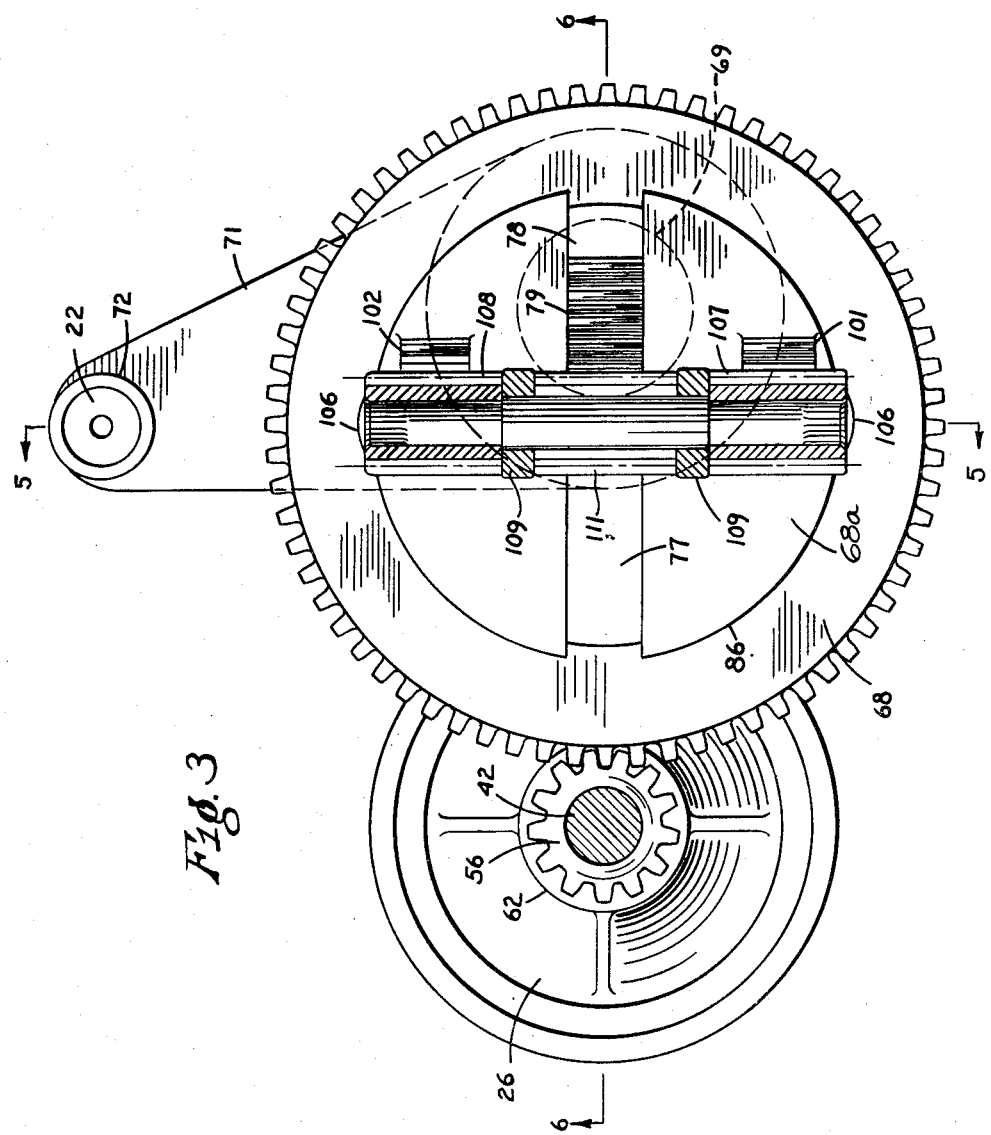
Fig. 3 is a plan view of a portion of the mechanism showing the eccentric planet gear.
Figure 5:
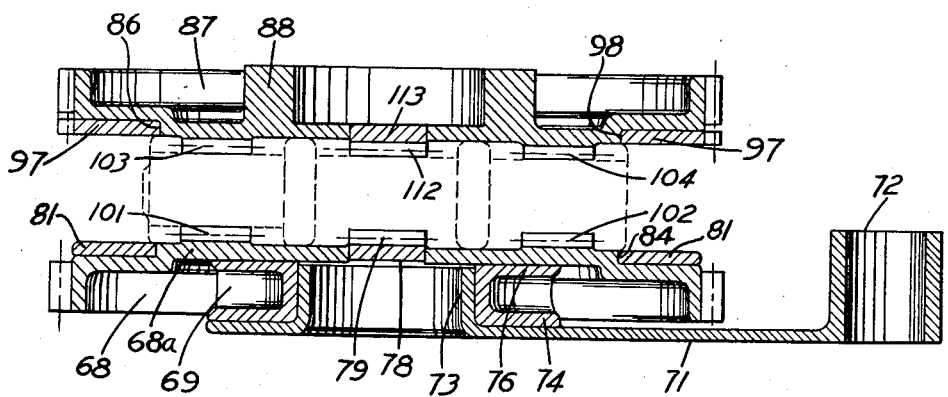
Fig. 5 is a vertical section through the planet gears taken on a plane indicated by the lines 5—5 in Fig. 3.

The eccentric planet gear 68 (Figs. 3, 5, and 6), which meshes with the pinion 56 on the agitator shaft, is supported by a hub 69, which is slidable radially of the gear, the hub being rotatably supported on an arm 71, pivoted in the housing. The arm 71 is formed with a boss 72 at one end thereof, which is bored for pivotal movement around one of the sleeves 22 in the housing. The opposite end of the arm is formed with a cylindrical boss 73 which provides a radial support for the hub 69 within which it is mounted. The hub has a lower flange 74 thereon which is borne by the surface of the arm circumjacent the boss 72, and has an upper flange 76 thereon which supports the gear 68.

The central portion 68a of the web of gear 68 is elevated, and is formed with a slot 77 therein, directed radially of the gear. The upper portion of the hub 69 is formed with a diametral wall 78 having a rack 79 machined in the upper surface thereof, the rack being disposed in a plane slightly above the flange 76, and being slidably received in the slot 77. Engagement of the rack within the slot constrains the hub from rotation relative to the gear. The rack teeth form a part of the mechanism for shifting the hub radially of the gear to vary the eccentricity of the gear and the consequent amplitude of the oscillatory motion. The flange 76 is cut away at one end of the rack bar 78 to permit maximum movement of the hub to the right as will be seen in Fig. 6.

The gear 68 is maintained in mesh with the pinion 56 by an arm 81 having a collar 82 at its inner end pivoted on a sleeve 83 on the agitator shaft 42, and formed with a bore 84 in its outer end which provides a bearing for the machined concentric surface 86 at the periphery of the offset central portion of the gear.

Under the combined action of the arms 71 and 81, the planet gear 68 is constrained since its center moves in an arc about the shaft 42, whereas its eccentric hub swings in an arc about a sleeve 22 of the housing, that is, substantially radially of the housing.

Figure 4:
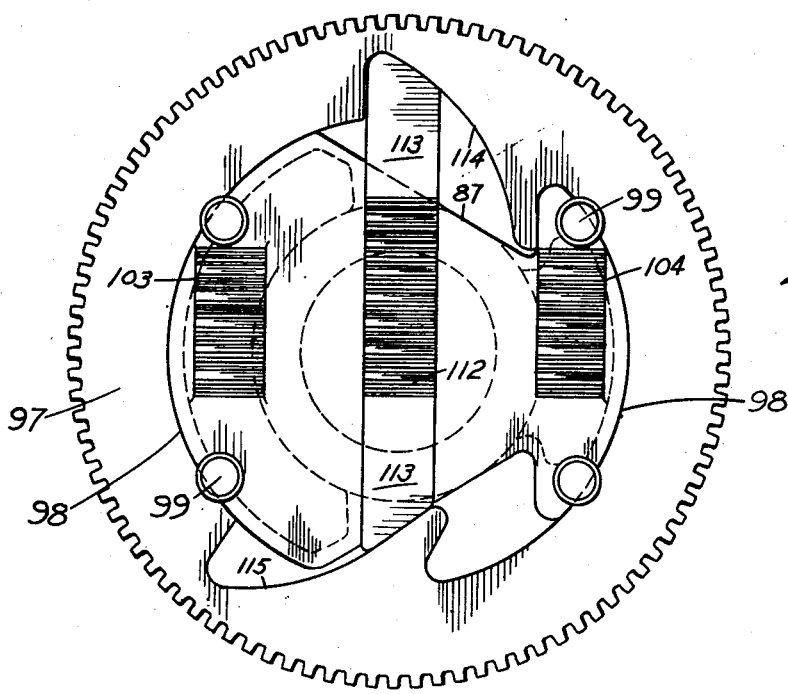
Fig. 4 is a view of the concentric planet gear as seen from below.

The concentric planet gear 87 (Figs. 4, 5, and 6) embodies a bored and faced hub 88 journalled on a flanged bearing sleeve 89 fixed in the housing. The sleeve 89 is formed with a conical bore 90 constituting the seat for a conical flange 91 struck from the marginal edge of an opening in the upper face 16 of the housing. The parts are retained in assembled relation by a plug 92 engaged with the flange 91 and threaded into the sleeve. The planet gear 87 meshes with a fixed pinion 93 (Figs. 1 and 6) which is retained in the portion 32 of the spider 33, preferably by being bonded therein during the die-casting of the member 33.

A stroke-adjusting pinion 94, mounted on the shaft 42, and rotatable independently of the shaft, is formed integral with the sleeve 83 and with a sleeve 96, which extends upwardly into the spider 33 through the fixed pinion 93.

The adjusting pinion 94 remains stationary except when the amplitude of the oscillation is adjusted. The pinion 94 has the same number of teeth as the pinion 93.

A ring gear 97, having the same diameter and number of teeth as the planet gear 87, is mounted on the lower face of the gear 87 in mesh with the adjusting pinion 94.

The bore of the ring gear is rotatably received on a turned outer face 98 of the web of the planet gear, and is retained thereon by buttons 99 threaded into the planet gear, the heads of which overlie the inner edge of the ring gear.

The means for coupling the two planet gears for concurrent rotation must accommodate lateral displacement of the two gears resulting from the eccentricity of the planet gears. The coupling comprises two parallel racks 101 and 102 formed on the upper face of the gear 68, and two parallel racks 103 and 104 on the lower face of the gear 87 within the ring gear 97. The racks 101 and 102 are parallel to, and equally spaced from, the sliding rack 79 on the hub 69. When the gearing is assembled, the racks 101 and 103 and the racks 102 and 104 are parallel and disposed in face-to-face relation. The intermediate coupling member comprises a floating shaft 106 having wide-faced pinions 107 and 108 splined on each end of the shaft. The pinion 107 meshes with the racks 101 and 103, and the pinion 108 meshes with the racks 102 and 104. Rollers 109, mounted for rotation on the shaft 106 and engaged with the faces of the planet gears are provided to maintain the pinions in proper lineal relation and prevent the teeth from bottoming in the racks.

Relative motion between the two planet gears may be considered with respect to a component parallel to the racks and a component in quadrature to the racks. The parallel component is accommodated by rotation of the pinions and shaft, the quadrature component by sliding movement of the pinions and shaft along the shaft axis. In this connection, the rollers 109, by engagement with the sides of the racks, prevent the intermediate member from sliding out of engagement with the racks. No relative rotation of the planet gears is possible, since the pinions 107 and 108 are mounted for simultaneous rotation with the shaft 106.

The means for varying the eccentricity of the gear 68 includes, as has been stated, the rack 79 on the hub 76. The rack is shifted by a pinion 111 rotatably mounted on the shaft 106 between the rollers 109. This pinion also meshes with a rack 112 cut in a bar 113 slidably mounted in a diametral path in the lower face of the gear 87. The ends of the bar 113 are formed for abutment against the spiral cam surfaces 114 and 115 formed in the inner edge of the ring gear 97. Thus, by rotating the ring gear with respect to the planet gear, the rack 112 is shifted radially of the gear, rotating the pinion 111 and shifting the rack 79 and hub 69 radially of the lower planet gear.

Normally, the gears 87 and 97 do not rotate relative to each other, and the amplitude of oscillation of the shaft 42 remains constant. To adjust the amplitude, the pinion 94 is turned, which incidentally may be accomplished during the operation of the machine. The pinion 94 is integral with the sleeve 96, the upper end thereof being machined to form a worm wheel 116 thereon (Figs. 1 and 2) disposed within the spider 33. A worm 117, cut into a shaft 118, meshes with and rotates the worm wheel 116. The shaft 118 is enclosed in a cylindrical housing 119 formed integral with the spider 33. A pin 121 in the housing, engaged in a groove 122 in the shaft, retains the shaft against axial displacement.

The outer end of the shaft 118 is coupled, by a shaft 123 (Fig. 1) and universal joints 124 and 125, to the spindle 126 of an adjusting knob 127. The spindle 126 is journalled in a boss 128 formed in the flange of the frame member 12, and is retained by a star washer 129 secured by a nut 131. A detent 132 having the inner end thereof seated upon the boss 128, and its intermediate portion bent to project through an opening 133 in the frame is engaged with the star washer 129. The detent is held within the opening 133 by a compression spring 134 engaged between the hub of the detent and the knob 127. The periphery of the knob is machined with a groove therein which is disposed in telescopic engagement with a cylindrical portion 136 of the frame. By pressing the knob inward, the star washer 129 may be released from the detent, and the shaft 123 rotated. The joints 124 and 125 are designed for sufficient telescopic movement to facilitate such action.

Alternately, by exerting an outward force against the protruding end 137 of the detent, the star washer may be released. Such operation may be effected by any well known form of linkage which if desired may be associated with a time-controlled actuating mechanism. In this event, the reaction of the work done by the agitator shaft will cause the hub 69 to return to the center of the gear 68, terminating the oscillating movement. For this action to take place, the gears 116 and 117 must be so designed as to be reversible.

If desired, the gears 116 and 117 may be made irreversible and the detent mechanism be omitted.

Preferably, the ratio of gear 87 to pinion 93 is slightly different from the ratio of gear 68 to pinion 56, with the result that the agitator shaft will "creep" slightly. The amount of creeping movement may be determined by well-known formulas for the action of compound planetary gears, as set out in the above-mentioned copending application.

One or more of sleeves 22 (Fig. 1), opposite the planet gears may be enlarged to balance the weight of the planet gears, or two sets of planet gears in opposite sides of the housing may be provided to secure a balanced mechanism.

It will be apparent to those skilled in the art that for certain applications where no variation of the amplitude of oscillation is desired, many of the principles of construction disclosed herein may be employed by omitting the parts of the device which adjust the amplitude. In such case, the type of coupling shown herein between the planetary gears may be retained, with omission of the pinion 111. With the pinion omitted, a single wide-faced rack on each planetary gear and a single coupling pinion, with rollers at the end of the pinion to retain it in engagement with the racks, may be used.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A device for coupling two offset substantially parallel shafts comprising two disks, each adapted to be connected to a shaft and having a face perpendicular thereto, the face of each disk being opposed to that of the other disk, two parallel racks on the face of each disk, the racks on each disk being parallel with and opposed to the racks on the other disk, a shaft perpendicular to the racks, and two pinions fast on the shaft, one pinion meshing with each opposed pair of racks.

2. A device for coupling two offset substantially parallel shafts comprising two disks, each adapted to be connected to a shaft and having a face perpendicular thereto, the face of each disk being opposed to that of the other disk, two parallel racks on the face of each disk, the racks on each disk being parallel with and opposed to the racks on the other disk, a shaft perpendicular to the racks, two pinions fast on the shaft, one pinion meshing with each opposed pair of racks, and a roller rotatable on the shaft engageable with the faces of the disks.

3. A device for coupling two offset substantially parallel shafts comprising two disks, each adapted to be connected to a shaft and having a face perpendicular thereto, the face of each disk being opposed to that of the other disk, two parallel racks on the face of each disk, the racks on each disk being parallel with and opposed to the racks on the other disk, a shaft perpendicular to the racks, two pinions fast on the shaft, one pinion meshing with each opposed pair of racks, and two rollers rotatable on the shaft engageable with the faces of the disks, and engageable with the sides of the racks to retain the pinions against sliding out of mesh with the racks.

4. A coupling member for offset shafts comprising a first member adapted to be connected to a first shaft and defining a plane normal to the axis of said first shaft, a second member mounted upon said first member and constrained to move along a line in the plane defined by the said first member, a third member adapted to be connected to a second shaft and defining a plane normal to the axis of said second shaft, a fourth member mounted upon said third member and constrained to move along a line in the plane defined by said third member, means coupling said first and said fourth members for simultaneous orthogonal motions, and means coupling said second and said third members for simultaneous sliding movement.

5. A coupling member for offset shafts comprising a first member adapted to be connected to a first shaft and defining a plane normal to the axis of said first shaft, a second member constrained to move along a diameter of said first member, a third member adapted to be connected to a second shaft and defining a plane normal to the axis of said second shaft, a fourth member constrained to move along a diameter of said third member, means coupling the said first member and the said fourth member for relative movements in quadrature, means coupling the said second and said third members for simultaneous movement, and means constraining said first and fourth members with respect to said second and third members.

6. A coupling for offset shafts comprising a first portion including a first member adapted to be connected to a first shaft, a first pair of spaced racks disposed in a plane perpendicular to the axis and fixed relative to the said first member, a first rack mounted for movement along a line between and in the plane of said first pair of racks, and means for controlling the position of said first rack relative to said first member, a second portion including a second member adapted to be connected to a second shaft and carrying a second rack on the face thereof disposed in a plane perpendicular to the axis of rotation of the shaft, a third member constrained to rotate with said second member but free to slide with respect thereto in the direction of the said second rack, a second pair of racks mounted on the front face of said third member in the plane of the said second rack and oppositely disposed with respect to the said first pair of racks and means for coupling said racks comprising a shaft having pinions fixed to the ends of the shaft for simultaneously engaging the oppositely disposed pairs of racks and a freely rotating pinion mounted on the shaft for simultaneously engaging the said first and second racks.

7. A device for coupling two offset shafts comprising parallel disk-like members disposed in planes perpendicular to the axes of the shafts, opposing pairs of racks formed on the faces of said members and spaced equi-distant from a diametric line through each of the members, a coupling for said opposing racks comprising pinions in spaced relation along a shaft, a first rack constrained along a diametral line of one member between the pair of racks on that member, means for shifting the said first rack with respect to said one member, the said one member being adapted to be connected to a first shaft, a hub associated with the remaining member adapted to connect the member to a second shaft, a second rack mounted on a face of said hub, a groove in the face of the remaining disk member disposed along a diametral line between the pair of racks on the face of that member to receive the said second rack, and a pinion mounted on said coupling shaft for coupling said first and second racks.

8. A device for coupling two offset shafts comprising two members disposed in spaced relationship, a first one of said members being adapted to be coupled to a rotating shaft, opposing pairs of racks formed on the faces of said members, pinions interengaging with and coupling said opposed racks, a shaft connecting said pinions for concurrent rotation, an opposing pair of racks associated with said members, one of said racks being adapted to be shifted relative to the said first member, a pinion interengaged with and coupling said last-named opposing pair of racks and mounted upon said shaft for free rotation with respect thereto, a hub member associated with a second of said two members, said hub member carrying the second rack of said last-named pair of racks and being mounted for sliding engagement with respect to the second of said two members so as to permit sliding motion between the two racks of said last-named pair of racks and said hub being adapted to be coupled to a rotating shaft whereby adjustment of the rack associated with the first of said two members causes an adjustment of the eccentricity of rotation of the two shafts to be coupled.

9. A device for coupling two offset shafts comprising a first hub adapted to be coupled to one of the shafts, said hub having an outer face and a rack projecting from said face, a member having a plate-like body bearing upon the outer face of said first hub, an opening in the body of said member for receiving the rack, and permitting sliding engagement of the member with the rack, the rack extending through the member, spaced racks on the outer face of said member, said racks being disposed on either side of said hub member and extending parallel thereto, a second hub adapted to be coupled to the remaining shaft and having an outer face spaced from the outer face of said member, two racks formed on the outer face of said second hub and disposed in opposition to the racks on said first hub member, a rack disposed in opposition to said first hub rack and supported by said second hub for motion with respect thereto, two pinions engaging the opposed racks on the first hub member and the second hub member, a shaft connecting said two pinions, and a pinion engaging the remaining opposed racks mounted upon said shaft and free to rotate with respect thereto, whereby adjustment of the rack associated with the second hub relative to that hub determines the relative rotation of the said two hubs.

JOSEPH D. KREIS.

References Cited in the file of this patent

UNITED STATES PATENTS

| Number | Name | Date |
|---|---|---|
| 1,599,397 | Jackson | Sept. 7, 1926 |
| 2,004,572 | Furness | June 11, 1935 |